(12) United States Patent
McAllister et al.

(10) Patent No.: US 8,285,730 B2
(45) Date of Patent: *Oct. 9, 2012

(54) REVIEWING USER-CREATED CONTENT BEFORE WEBSITE PRESENTATION

(75) Inventors: Ian A. McAllister, Seattle, WA (US); Christoph R. Ponath, Woodinville, WA (US); Delane R. Hewett, Bellevue, WA (US); Mackenzie Steele, Bellevue, WA (US); Srivaths B. Copparam, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/771,356

(22) Filed: Apr. 30, 2010

(65) Prior Publication Data
US 2010/0223270 A1    Sep. 2, 2010

Related U.S. Application Data

(63) Continuation of application No. 11/383,365, filed on May 15, 2006, now Pat. No. 7,739,289.

(51) Int. Cl.
*G06F 7/00*    (2006.01)
*G06F 17/30*    (2006.01)
(52) U.S. Cl. ........................................................ 707/754
(58) Field of Classification Search ................ 707/754, 707/999.001
See application file for complete search history.

(56) References Cited

U.S. PATENT DOCUMENTS

| | | | | |
|---|---|---|---|---|
| 5,996,011 | A * | 11/1999 | Humes | 709/225 |
| 6,633,855 | B1 * | 10/2003 | Auvenshine | 706/15 |
| 6,782,510 | B1 * | 8/2004 | Gross et al. | 715/257 |

* cited by examiner

*Primary Examiner* — Alexey Shmatov
(74) *Attorney, Agent, or Firm* — Shook Hardy & Bacon L.L.P.

(57) ABSTRACT

Methods and systems for reviewing content items created by users for presentation in association with a website are provided. Automatic scrubbing (followed by manual review, if necessary) of user-created content items that have yet to be presented in association with a website is provided as is manual review of user-created content items that have already been presented in association with a website at the request of a user.

16 Claims, 8 Drawing Sheets

| | |
|---|---|
| NAMESPACE: | MSN SHOPPING |
| CONTENT TYPE: | BASELINEPLUS PRODUCTS |
| CONTENT ID: | 425583193 |
| REVIEW ID: | 3FD8B850-E730-430C-B06F-5373CF569C04 |
| REVIEW DATE: | 5/2/2006 2:31:00 PM |
| REVIEW AGE: | 1 MINUTE |
| REVIEWER NICKNAME: | EENMAKASTA |
| TITLE: | |
| AWESOME SANDALS | |
| PROS: | |
| I LIVE IN THESE SANDALS. THEY ARE THE SH****T(SUSPECT[G])! | |
| REVIEW STATUS: | SUSPECT ▽ |

SAVE

FIG. 6

| NAMESPACE: | MSN SHOPPING |
|---|---|
| CONTENT TYPE: | BASELINEPLUS PRODUCTS |
| CONTENT ID: | 33512345 |
| REVIEW ID: | 65212EBF-CE86-4023-9F7C-4EC3E1572DD4 |
| REVIEW DATE: | 4/22/2006 2:27:00 AM |
| REVIEW AGE: | |
| REVIEWER NICKNAME: | GEORGE-KOBLAH |
| TITLE: | |
| MR | |
| CONS: | |
| ADDRESS 174 GHANA-MALLAM | |
| PROS: | |
| I AM A BUSINES MAN I DON'T PLAY WITH MY WORK AND I NEED A LAPTOP TO WORK HARDER SO I CAN GET MONEY TO HELP MY CUNTRY SO PLASE HELP ME | |
| COMMENTS: | |
| THANKS | |
| REVIEW STATUS: | SUSPECT-PUBLISH ⌵ |
| VIOLATION REPORTS: | 1 VIOLATION REPORTS — 710 |
| SAVE | |

VIOLATION REPORTS

NAME: NONAMEPROVIDED
EMAIL ADDRESS: NOEMAILPROVIDED@MICROSOFT.COM
DATE: 4/25/2006 6:30:00 PM
COMMENTS:
THIS IS NOT A REVIEW

CLOSE WINDOW

REVIEWING USER-CREATED CONTENT BEFORE WEBSITE PRESENTATION

CROSS-REFERENCE TO RELATED APPLICATIONS

This application is a continuation of U.S. application Ser. No. 11/383,365, now U.S. Pat. No. 7,739,289, filed May 15, 2006, entitled "REVIEWING USER-CREATED CONTENT BEFORE WEBSITE PRESENTATION," the teachings of which are hereby incorporated by reference in their entirety.

STATEMENT REGARDING FEDERALLY SPONSORED RESEARCH OR DEVELOPMENT

Not Applicable.

BACKGROUND

Websites that implement community features provide users the ability to present content in association therewith for consumption by all users. Examples of this user-created content are product reviews and discussion group posts. Websites typically contain a web page with guidelines that users are asked to adhere to when submitting content for presentation. Some users, either intentionally or unintentionally, violate published guidelines by submitting content for presentation that is abusive due to profanity, spam, or inclusion of other content that violates the website's guidelines for user-created content. Presentation of this abusive content on the website can lead to customer dissatisfaction, distrust, or even legal issues if the content is egregious enough (e.g., if the user-created content includes threats, racist language, or the like).

Existing processes for detecting and preventing publication of abusive user-created content are either manual processes that involve a large number of support staff reading content in its entirety, or automatic processes with overly simplistic logic that users can easily circumvent by slightly obfuscating potentially abusive language.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In embodiments, the present invention provides systems and methods for automatically reviewing content items created by users prior to presentation of the content items in association with a website. Utilizing such systems and methods, user-created content that contains one or more objectionable words/phrases is prevented from being presented in association with the website. Additionally, embodiments of the present invention provide systems and methods for permitting users visiting a website having user-created content presented in association therewith to submit content items already presented in association with the website for review. A user may choose to do this, for instance, if s/he believes a particular content item violates the website's published guidelines relating to profanity, spam, or the like. In still further embodiments, the present invention provides systems and methods for permitting an administrative user to access stored suspect content items, manually review them, and assign each one an objectionable or non-objectionable status. If the content item is manually assigned an objectionable status, it will either not be presented in association with the website or will be removed there from, whichever is appropriate. If the content item is manually assigned a non-objectionable status, it will either be presented in association with the website or will be permitted to remain presented in association with the website, whichever is appropriate.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for automatically reviewing content items created by users prior to presentation of the content items in association with a website. Utilizing embodiments of the systems and methods herein disclosed, user-created content that contains one or more objectionable words or phrases is prevented from being presented in association with the website. Additional embodiments of the present invention provide systems and methods for permitting users visiting a website having user-created content presented in association therewith to submit content items already presented in association with the website for review. A user may choose to do this, for instance, if s/he believes a particular content item violates the website's published guidelines relating to profanity, spam, or the like. In still further embodiments, the present invention provides systems and methods for storing suspect content items, i.e., content items assigned a suspect status either by a previous automatic review process prior to presentation in association with the website or content items already presented in association with the website that a user has submitted for review, for manual review. An administrative user may then access the stored suspect content items, review them, and assign each one an objectionable or non-objectionable status. If the content item is manually assigned an objectionable status, it will either not be presented in association with the website or will be removed there from, whichever is appropriate. If the content item is manually assigned a non-objectionable status, it will either be presented in association with the website or will be permitted to remain presented in association with the website, whichever is appropriate.

Having briefly described an overview of the present invention, an exemplary operating environment for embodiments of the present invention is described below.

Figure 1:
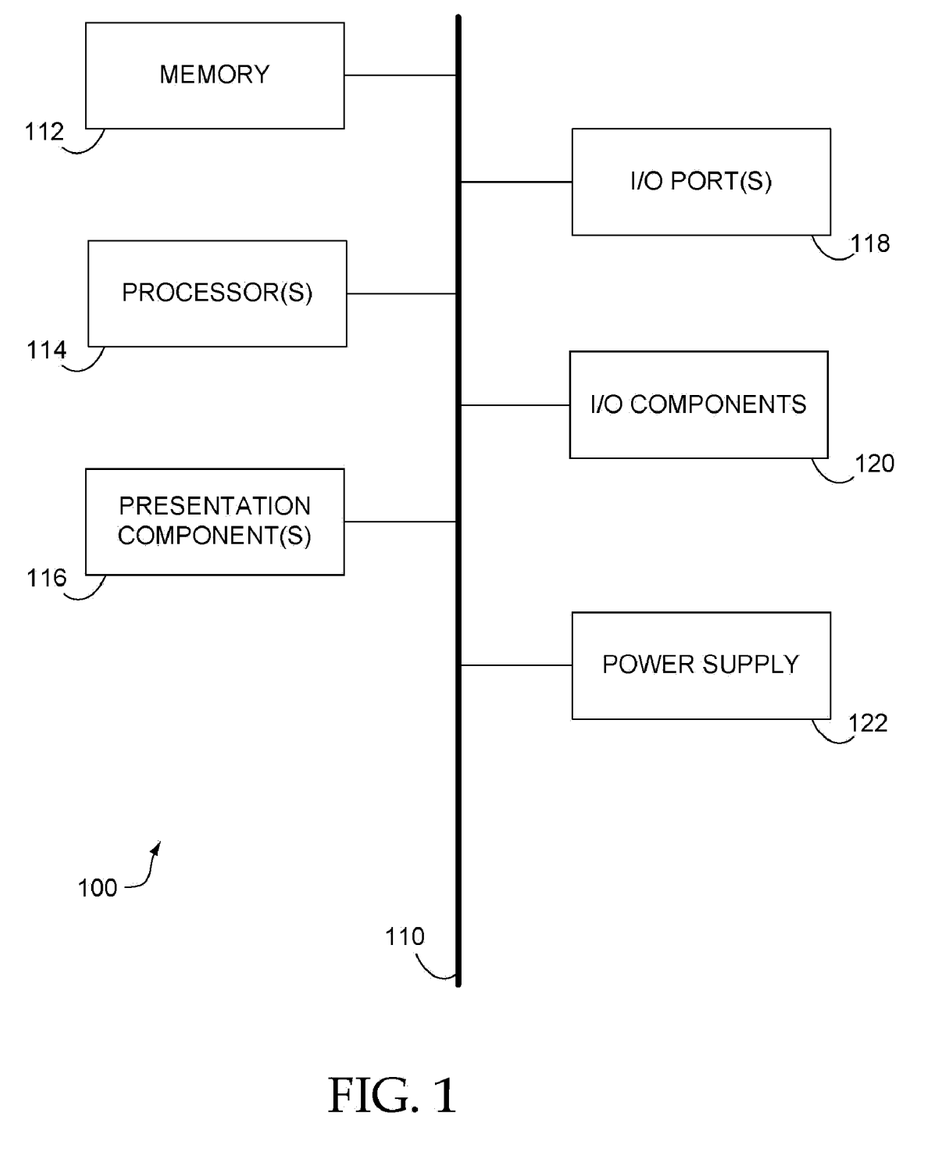
FIG. 1 is a block diagram of an exemplary computing environment suitable for use in implementing embodiments of the present invention.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, and the like, refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
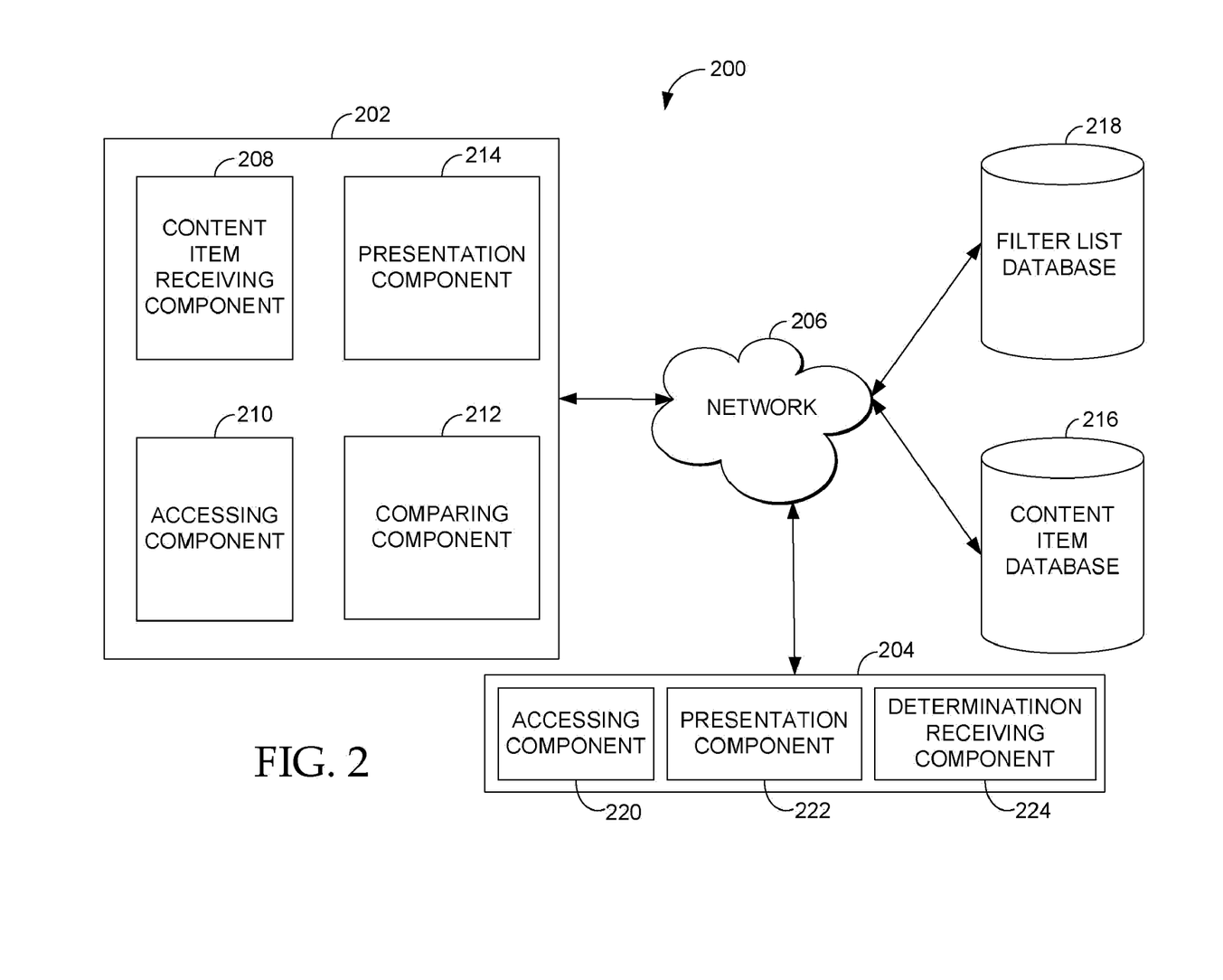
FIG. 2 is a block diagram of an exemplary system architecture for use in implementing embodiments of the present invention.

Referring now to FIG. 2, a block diagram is illustrated that shows an overall system architecture 200 for review of content items created by users for presentation in association with a website. It will be understood and appreciated by those of ordinary skill in the art that the overall system architecture 200 shown in FIG. 2 is merely an example of one suitable computing environment and is not intended to suggest any limitation as to the scope of use or functionality of the present invention. Neither should the overall system architecture 200 be interpreted as having any dependency or requirement related to any single component or combination of components illustrated therein.

System 200 includes a user device 202 connected to an administrative device 204 via a network 206. Each of the user device 202 and the administrative device 204 shown in FIG. 2 may be any type of computing device, such as, for example, computing device 100 described above with reference to FIG. 1. By way of example only and not limitation, the user device 202 and/or the administrative device 204 may be a personal computer, desktop computer, laptop computer, handheld device, consumer electronic device, and the like. It should be noted, however, that the invention is not limited to implementation on such computing devices, but may be implemented on any of a variety of different types of computing devices within the scope of embodiments of the present invention.

As shown in FIG. 2, the user device 202 includes a content item receiving component 208, an accessing component 210, a comparing component 212, and a presentation component 214 for implementing embodiments of the present invention. In some embodiments, the components 208, 210, 212 and 214 may be implemented as stand-alone applications. In other embodiments, the components 208, 210, 212 and 214 may be integrated directly into the operating system for the user device 202. It will be understood by those skilled in the art that the components 208, 210, 212 and 214 illustrated in FIG.

2 are exemplary in nature and in number and should not be construed as limiting. Any number of components may be employed to achieve the desired functionality within the scope of embodiments of the present invention.

The content item receiving component 208 is configured for receiving one or more content items input by a user at the user device 202 for presentation in association with a website, each content item having at least one word or phrase included therein. In one embodiment, the content item receiving component 208 is further configured for transmitting received content items to a content item database 216 for storage (via network 206). By way of example only, a content item input by the user may be a product review, discussion group posting, or the like.

The accessing component 210 of the user device 202 is configured for accessing user-created content items (e.g., from the content item database 216) and one or more filter lists, e.g., from a filter list database 218, via network 206. Filter lists are discussed more fully herein below and typically include one or more words or phrases having a pre-determined objectionable or suspect status associated therewith.

The comparing component 212 is configured for comparing the words or phrases included in user-created content items with the words or phrases included in one or more filter lists. In one embodiment, the comparing component 212 is further configured for determining if any matches occur between the words or phrases included in a user-created content item and the words or phrases included in one or more filter lists. Still further, in one embodiment, the comparing component 212 is configured for transmitting the results of such determinations (via network 206) for storage in association with the appropriate user-created content items. By way of example only, the comparing component 212 may transmit the results of such determination to content item database 216 for storage in association with the user-created content items to which such determinations relate. In one embodiment, the comparing component 212 is additionally configured for determining a status (e.g., objectionable, non-objectionable, or suspect) for user-created content items based upon a status of any matching words or phrases included therein. In one embodiment, the comparing component 212 is further configured for transmitting such status determinations to content item database 216 for storage in association with the user-created content items to which such determinations pertain. Assigning of status to words/phrases and content items is more fully described below with reference to FIG. 3.

The presentation component 214 of the user device 202 is configured to present non-objectionable, user-created content in association with a website. Typically, presentation of the non-objectionable, user-created content comprises displaying the user-created content on a display device associated with the user device 202. However, other types of presentation, such as an audible presentation, may also be provided within the scope of embodiments of the present invention. In one embodiment, the presentation component 214 of the user device 202 is further configured to present, in association with the website, a user interface for receiving a user request for manual review of user-created content items that have already been presented in association with a website and for transmitting such user requests for storage pending such manual review. In one embodiment, the user requests may be transmitted to the content item database 216 (via network 206) for storage.

Administrative device 204 includes an accessing component 220, a presentation component 222, and a determination receiving component 224 for implementing embodiments of the present invention. In some embodiments, the components 220, 222 and 224 may be implemented as stand-alone applications. In other embodiments, the components 220, 222 and 224 may be integrated directly into the operating system for the administrative device 204. It will be understood by those skilled in the art that the components 220, 222 and 224 illustrated in FIG. 2 are exemplary in nature and in number and should not be construed as limiting. Any number of components may be employed to achieve the desired functionality within the scope of embodiments of the present invention.

The accessing component 220 of the administrative device 204 is configured to access user-created content items that have been assigned a suspect status. In one embodiment, the accessing component 220 may access such user-created content items from the content item database 216 (via network 206). As more fully described below, user-created content items may be assigned a suspect status through an automatic review process prior to presentation of the content item in association with the website or through a user submitting a content item that has already been presented in association with the website for manual review.

The presentation component 222 of the administrative device 204 is configured to present suspect user-created items for manual review by an administrative user. Typically, presentation of the suspect user-created items comprises displaying the user-created content items on a display device associated with the administrative device 204. However, other types of presentation, such as an audible presentation, may also be provided within the scope of embodiments of the invention. In one embodiment, the presentation component 222 is further configured to present the suspect user-created items with the suspect word(s) or phrase(s) singled out (e.g., highlighted, underlined, bolded, italicized, colored, or the like) for easier and more efficient manual review.

The determination receiving component 224 is configured for receiving a determination from an administrative user regarding whether a suspect user-created content item is to be assigned an objectionable or non-objectionable status subsequent to manual review. In one embodiment, the determination receiving component 224 is further configured to transmit such determination for storage in association with the appropriate user-created content item. In one embodiment, the determination may be transmitted to the content item database 216 (via network 206) for storage in association with the user-created content item to which it pertains.

Figure 3:
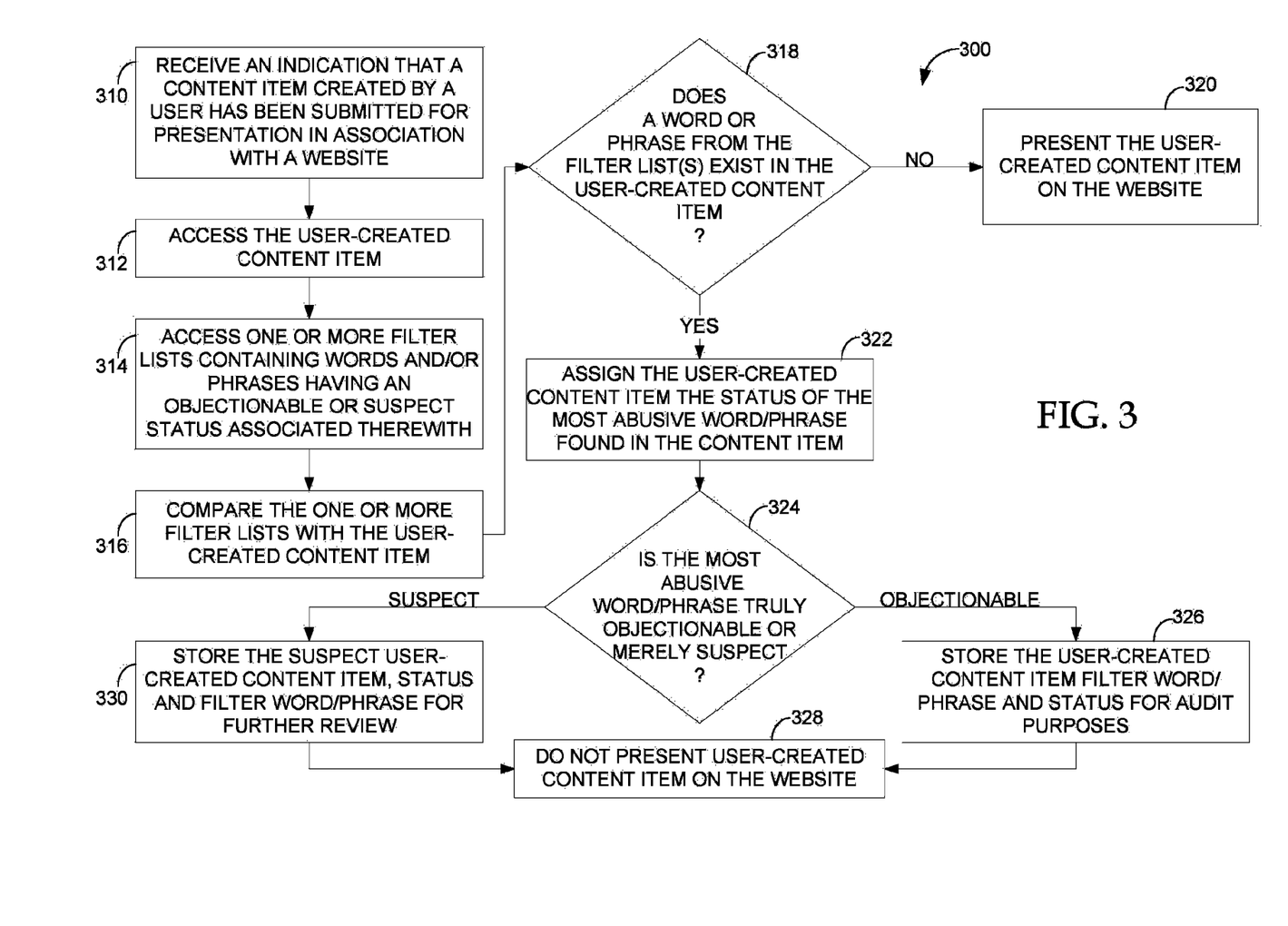
FIG. 3 is a flow diagram, in accordance with an embodiment of the present invention, illustrating a method for automatically reviewing user-created content items prior to presentation in association with a website.

Referring now to FIG. 3, a flow diagram is illustrated that shows an exemplary method 300 for automatically reviewing a user-created content item prior to presentation on a website. Initially, as indicated at block 310, a content item created by a user that has been submitted for presentation in association with a website is received, e.g., by content item receiving component 208 of FIG. 2, as is an indication of such receipt. By way of example only and not limitation, the user-created content item may be a product review, discussion group posting, or the like and has at least one word or phrase included therein. In one embodiment, upon receipt of the user-created content item, such content item is assigned a status of null and is transmitted (via network 206) to a content item database 216 for storage. If desired, the user-created content item may be stored in a field of the content item database 216 reserved for storage of content items that have yet to undergo substantive content review (i.e., content items having a null status).

Upon receipt of the indication that a user-created content item has been received, or based upon a pre-determined time interval, a content review (or scrubbing) process is automatically initiated, that is, without user intervention. Initially, the user-created content item is accessed, e.g., by accessing component 210 of FIG. 2, as indicated at block 312. Prior to, subsequent to, or simultaneously with accessing of the user-created content item, one or more filter lists containing words and/or phrases having an objectionable or suspect status associated therewith is accessed, as indicated at block 314. As used herein, the term "filter list" refers to a list of words and/or phrases that have previously been determined to have an objectionable or suspect status associated therewith. As such, each filter list includes not only the objectionable or suspect words/phrases but also a status associated with each word/phrase. In one embodiment, those words/phrases that are associated with an objectionable status will also include a categorization indicative of a level of abusiveness associated with the objectionable status. For instance, one word/phrase may be associated with an objectionable-hate status which may be accorded a higher level of abusiveness than another word/phrase that is associated with an objectionable-profanity status. Other examples of categories that may be associated with objectionable words/phrase include, without limitation, spam, garbage, and personal information. Generally, words/phrases having a suspect status are viewed as less abusive than any word/phrase having an objectionable status associated therewith.

In one embodiment, a single filter list may be accessed for comparison of the words/phrases included therein with the words/phrase included in the user-created content item being reviewed. In another embodiment, multiple filter lists may be accessed for comparison. For instance, a global filter list that includes a list of filter words/phrases that are applicable to user-created content items to be presented on any website may be accessed in addition to a website-specific filter list that includes a list of filter words/phrases that are applicable only to user-created content items to be presented in association with the particular website to which the website-specific filter list is directed.

Subsequently, as indicated at block 316, the words and/or phrases included in the one or more filter lists are compared (e.g., utilizing comparing component 212 of the user device 202 of FIG. 2) with the words and/or phrases included in the user-created content item. Based upon such comparison, it is determined whether one or more words/phrases from the filter list(s) exist in the user-created content item. This is indicated at block 318. Typically, if multiple filter lists are accessed, the filter lists will be assigned an order for comparison. For instance, if a global filter list and a website-specific filter list are accessed, the global filter list may be utilized for comparison first and upon completion of comparison of the words/phrases included in the global filter list with the words/phrases included in the user-created content item, the website-specific filter list may be utilized for comparison. Typically, discrepancies between the multiple filter lists will be decided in favor of only one of the filter lists. In one embodiment, a global filter list and a website specific filter list are accessed and any discrepancies that arise are decided in favor of the website-specific filter list.

Comparisons may be made between the words/phrases of the filter list(s) with the words/phrases of the user-created content item being reviewed utilizing exact and/or pattern matching techniques. Although not universally the case, words/phrases in the filter list(s) associated with an objectionable status may be matched based upon an exact matching technique and words/phrases in the filter list(s) associated with a suspect status may be matched based upon a pattern matching technique. Various exact and pattern matching techniques are known to those of ordinary skill in the art and, accordingly, are not further discussed herein. Typically, comparisons are made on a word/phrase by word/phrase basis, although embodiments involving comparison of predetermined fields and/or the content item as a whole are contemplated to be within the scope of embodiments hereof.

If none of the words/phrases from the filter list(s) exist in the user-created content item, the content item is assigned a status of non-objectionable or okay (that is, okay to publish) and presented on the website, as indicated at block 320. In one embodiment, such presentation is performed by the presentation component 214 of the user device 202 of FIG. 2. However, as indicated at block 322, if it is determined at block 318 that one or more words/phrases from the filter list(s) exist in the user-created content item, the content item is assigned the status of the most abusive word/phrase found therein. That is, if a single word/phrase included in the user-created content item being reviewed matches a single word/phrase included in the filter list(s), the status of the matching word/phrase is assigned to the user-created content item. However, if multiple words/phrases included in the user-created content item being reviewed match multiple words/phrases included in the filter list(s) to which such content item is compared, the content item as a whole is assigned the status of the matching word/phrase having the highest level of abusiveness associated therewith.

Subsequently, it is determined whether the most abusive word/phrase found in the user-created content item is truly objectionable (that is, has an objectionable status associated therewith) or merely suspect (i.e., has a suspect status associated therewith), as indicated at block 324. If the most abusive word/phase found in the user-created content item is truly objectionable, the user-created content item, the objectionable word/phrase from the filter list, and the status, including any categorization associated therewith (e.g., objectionable-hate), are stored in association with one another, as indicated at block 326. In one embodiment, the content item, the objectionable word/phrase from the filter list, and the status are stored, e.g., in the content item database 216 of FIG. 2, in a field reserved for user-created content items that have been reviewed and for which no further action is required. Such storage is primarily for audit purposes. In such situation, the user-created content item is not presented in association with the website, as indicated at block 328.

If, however, it is determined at block 324 that the most abusive word/phrase found in the user-created content item is merely suspect, the user-created content item, the suspect word/phrase from the filter list(s), and the status (i.e., suspect) are stored in association with one another for further review. This is indicated at block 330. In one embodiment, the content item, the suspect word/phrase from the filter list, and the status are stored, e.g., in the content item database 216 of FIG. 2, in a field reserved for user-created content items that have been reviewed and for which further action is required. In such situations, the user-created content is not presented in association with the website, as indicated at block 328, until further review is completed. One embodiment for implementing such further review is a manual review process discussed more fully herein below with reference to FIG. 5.

Figure 4:
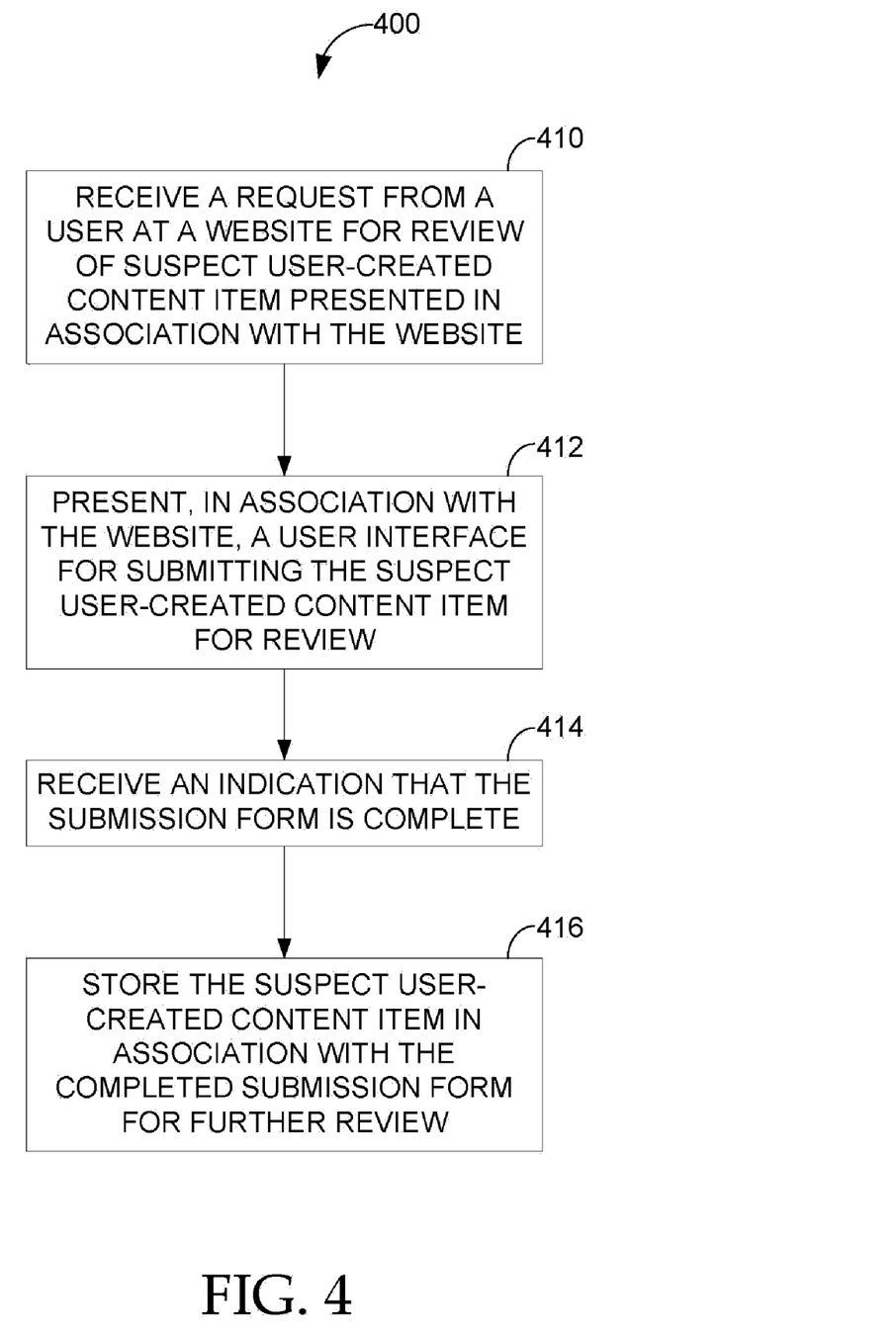
FIG. 4 is a flow diagram illustrating a method for accepting user requests for manual review of content items already presented in association with a website, in accordance with an embodiment of the present invention.

With reference now to FIG. 4, a flow diagram is illustrated which shows a method 400 for accepting user requests for review of content items already presented in association with a website. Initially, as indicated at block 410, a request is received from a user at the website for review of a user-created content item presented in association with the website that s/he believes to be suspect. This is indicated at block 410. A user may request review of a particular content item, for instance, if s/he believes the content item violates the website's published guidelines relating to profanity, spam, or the like. Subsequently, as indicated at block 412, a user interface is presented in association with the website configured to receive user input regarding the user-created content item s/he believes is suspect and in need of review.

Next, as indicated at block 414, an indication that the review request submission form is complete is received and the suspect user-created content item is stored in association with the completed submission form pending further review. This is indicated at block 416. In one embodiment, the submission form and the user-created content item to which it pertains are stored in the content item database 216 of FIG. 2 in a field reserved for user-created content items assigned a suspect status by a user which are pending further review. In one embodiment, the user-created content item remains presented in association with the website until further review is completed. However, embodiments of the present invention also contemplate removing the user-created content item from the website pending completion of further review.

Figure 5:
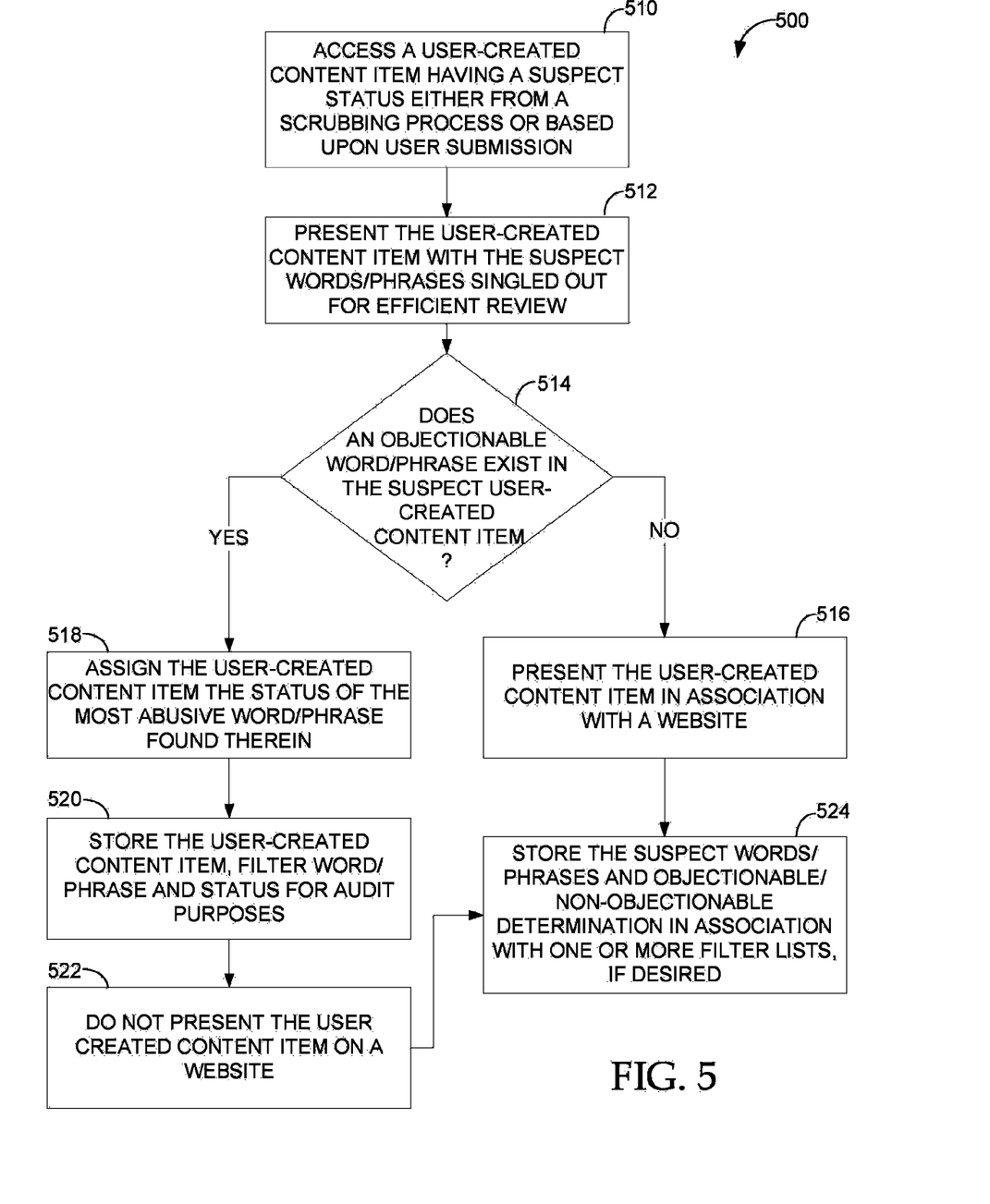
FIG. 5 is a flow diagram illustrating a method, in accordance with an embodiment of the present invention, for reviewing suspect user-created content items.

With reference now to FIG. 5, a flow diagram is illustrated which shows a method 500 for reviewing suspect user-created content items. Initially, as indicated at block 510, a user-created content item having a suspect status is accessed, e.g., from content item database 216 utilizing accessing component 220 of administrative device 204 of FIG. 2. Typically, access is initiated by an administrative user logging in and accessing a first-in, first-out queue of suspect content items. User-created content items may have a suspect status associated therewith based upon an automatic content review process of user-created content that has not yet been presented in association with a website (for instance, the automatic content review process described hereinabove with reference to FIG. 3) or based upon a user submitting an already presented user-created content item for review, e.g., utilizing the submission process described hereinabove with reference to FIG. 4.

Figure 6:
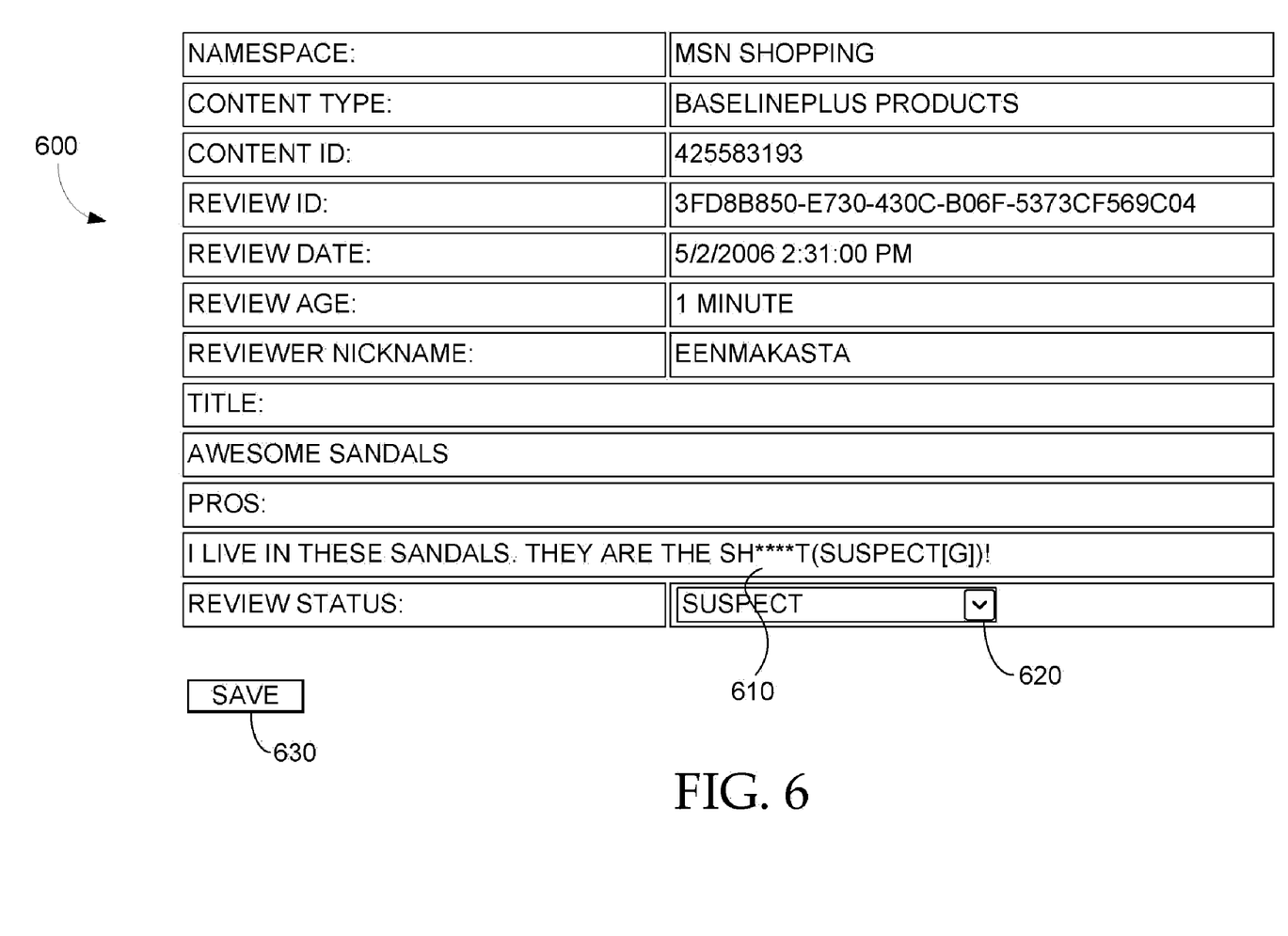
FIG. 6 is a screen display of an exemplary user interface for presenting suspect user-created content items with the word/phrase which precipitated the assigning of a suspect status being singled out for easier and more efficient review, in accordance with an embodiment of the present invention.

Subsequently, as indicated at block 512, a user interface is presented (e.g., utilizing presentation component 222 of administrative device 204 of FIG. 2) that includes the suspect user-created content item (or at least a portion thereof) with the word(s)/phrase(s) that precipitated the assigning of the suspect status singled out for easier and more efficient review, if possible. An exemplary user interface 600 illustrating such presentation is shown in the screen display of FIG. 6. In the illustrated embodiment, the word(s)/phrase(s) that precipitated the assigning of the suspect status is singled out by having the suspect status indicator displayed parenthetically in association with the suspect word(s)/phrase(s) 610. It will be understood and appreciated by those of ordinary skill in the art, however, that word(s)/phrase(s) may be singled out using a variety of methods including, but not limited to, highlighting, underlining, bolding, italicizing, coloring, or the like.

Figure 7:
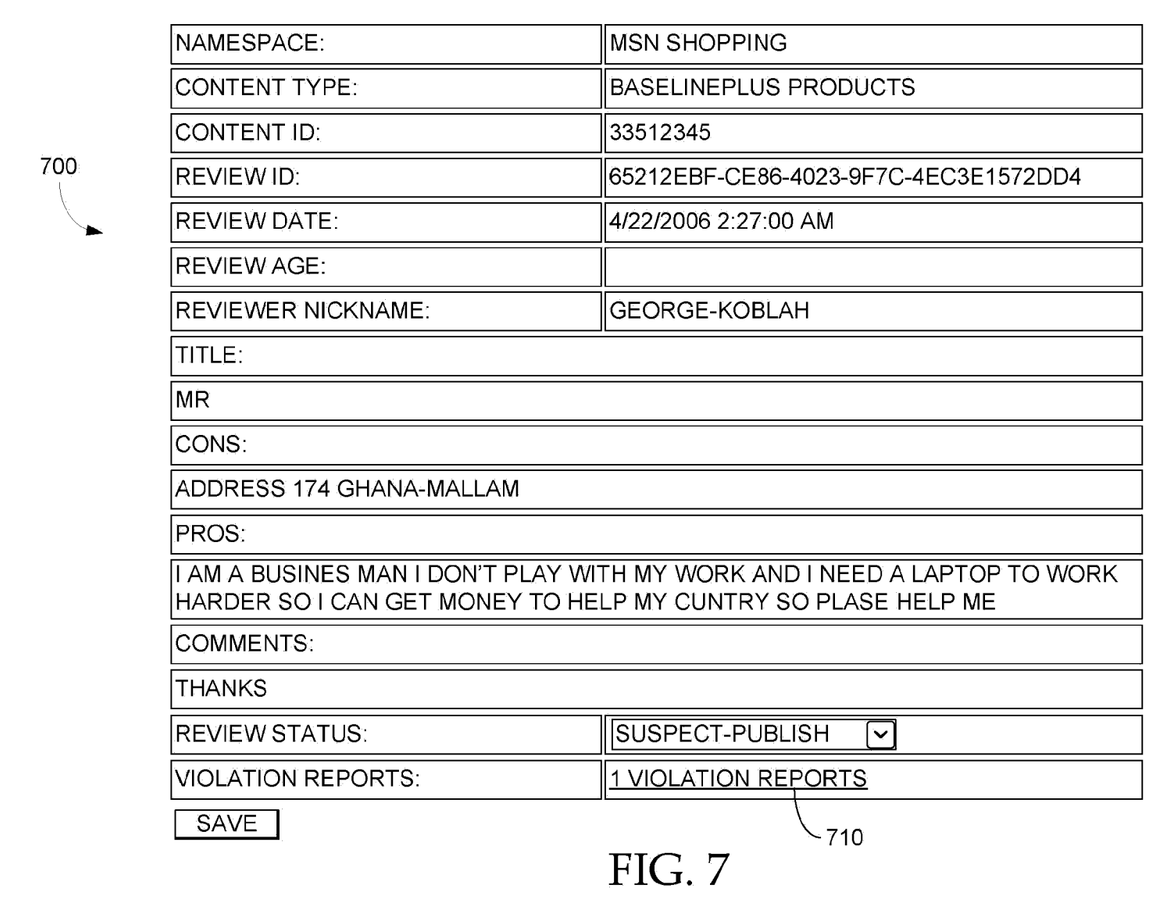
FIG. 7 is a screen display of an exemplary user interface for presenting an already published user-created content item which has been submitted for review by a user visiting a website, in accordance with an embodiment of the present invention.
Figure 8:
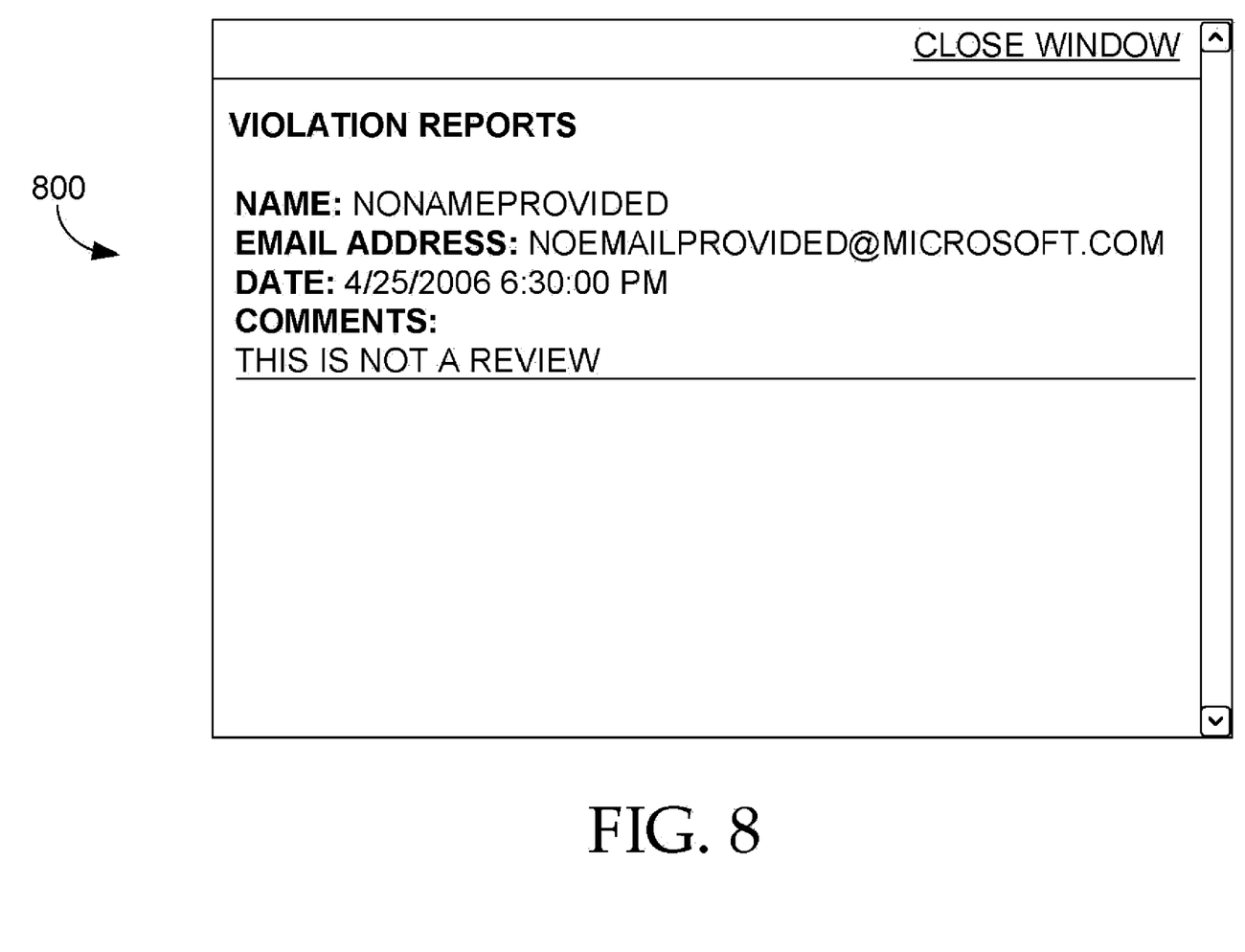
FIG. 8 is a screen display of an exemplary user interface illustrating a violation report submitted by a user in conjunction with a user-created content item s/he has submitted for review, in accordance with an embodiment of the present invention.

In one embodiment, if the content item being reviewed is a content item which has already been published in association with a website and has had a visitor to the website submit it for review, the user interface 700 illustrated in FIG. 7 may be presented. Note that in this instance, the word(s)/phrase(s) that precipitated the assigning of a suspect status is not singled out but that a link 710 to a violation report is provided. Upon selection of the link 710, the administrative user will be presented with the user interface 800 of FIG. 8 where s/he will be able to view the reason(s) for the website visitor's submission of the content item for review.

Subsequently, it is determined whether an objectionable word/phrase exists in the suspect user-created item presented, as indicated at block 514. Typically, such determination is made by an administrative user who is manually reviewing the suspect user-created content item. In one embodiment, if the word(s)/phrase(s) that precipitated the assigning of the suspect status is singled out, a determination is made whether the singled out word/phrase should be assigned an objectionable or non-objectionable status. In the embodiment illustrated in FIG. 6, the administrative user may change the status of the word/phrase from suspect to objectionable or non-objectionable (okay) by selecting from a menu of options presented upon selection of the arrow 620. Upon completion of such manual review, an indication is received that the manual review is complete and that an objectionable/non-objectionable determination has been made, e.g., by user selection of the 'save' indicator 630. In one embodiment, such indication, and the corresponding determination, are received by determination receiving component 224 of the administrative device 204 of FIG. 2.

In one embodiment, the administrative user may escalate the user-created content item to a second tier of support for disposition is s/he cannot initially assign the content item an objectionable or non-objectionable status with a high degree of confidence.

If it is determined at block 514 that an objectionable word/phrase does not exist in the suspect user-created item being reviewed, the user-created content item is presented in association with the website, as indicated at block 516. Note that if the suspect user-created content item being reviewed is a content item that a user at the website submitted for review, the user-created content item may already be presented in association with the website. In this instance, the presentation of the content item is permitted to persist without interruption.

If, however, it is determined at block 514 that an objectionable word/phrase does exist in the suspect user-created content item being reviewed, the user-created content item is assigned the status of the most abusive word/phrase found therein. This is indicated at block 518. That is, if the administrative user determines that the suspect user-created content item contains a word/phrase that should be assigned an objectionable-hate status and a word/phrase that should be assigned an objectionable-profanity status, the suspect user-created content item is assigned the status objectionable-hate, provided the objectionable-hate status has a higher level of abusiveness than the objectionable-profanity status.

Next, as indicated at block 520, the user-created content item, the filter word/phrase that precipitated the assigning of an objectionable status, and the assigned status (including any categorization, if applicable) are stored, e.g., in content item database 216 of FIG. 2. In one embodiment, such user-created content item, the offending word/phrase, and the status are stored in a field reserved for user-created content items that have been reviewed and for which no further action is required. Such storage is primarily for audit purposes. In such situation, the user-created content item is not presented in association with the website, as indicated at block 522. Note that if the suspect user-created content item being reviewed is a content item that a user at the website submitted for review, the user-created content item may already be presented in association with the website. In this instance, the presentation of the content item is terminated.

Whether the user-created content item is determined to contain an objectionable word/phrase or not, the suspect word(s)/phrase(s) and the assigned objectionable/non-objectionable status may be stored in association with one another and in association with one or more filter lists, e.g., a filter list included in the filter list database 218 of FIG. 2. In this way, a subsequent review of a user-created content item that contains the previously suspect words(s)/phrase(s) may be assigned an objectionable or non-objectionable status without the need for manual review. Thus, the system is permitted to become more accurate and more efficient each time the methods supported thereby are invoked.

In one embodiment, updates of one or more filter lists (e.g., the filter lists stored in association with filter list database 218) may be received and automatic re-scrubbing of content items may be performed upon such receipt. In one embodiment, such automatic re-scrubbing may be initiated for user-created content items meeting a pre-determined criterion, e.g., having a creation time following within a certain time frame, or the like.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media excluding signals per se having computer-executable instructions embodied thereon that, when executed by a processor, perform a method for reviewing content items created by users for presentation in association with a website, the method comprising:
   receiving an indication that a content item created by a user has been submitted for subsequent presentation at the website, the content item having at least one word or phrase included therein;
   automatically accessing the content item upon the expiration of a predetermined time interval after receiving the indication that the content item is created by the user;
   automatically initiating an automatic review process without user intervention, the review process comprising:
   (1) accessing a first filter list that includes at least one word or phrase predetermined as having an objectionable status associated therewith and a second filter list that includes at least one word or phrase predetermined as having a suspect status associated therewith, wherein the objectionable status refers to words or phrases having a categorization indicative of a particular level of abusiveness comprising at least one of spam, garbage, personal information, profanity, or hate language; and wherein the suspect status refers to words or phrases that are less abusive than the words or the phrases determined to have the objectionable status;
   (2) automatically comparing the at least one word or phrase included in the content item with the first filter list and the second filter list;
   (3) automatically determining whether the at least one word or phrase included in the content item matches the at least one word or phrase included in the first filter list or the second filter list;
   (4) when the at least one word or phrase included in the content item matches the at least one word or phrase in the first filter list, assigning an objectionable status to the at least one word or phrase included in the content item;
   (5) when the at least one word or phrase included in the content item is assigned the objectionable status, assigning an appropriate categorization to the at least one word or phrase included in the content item;
   (6) when the at least one word or phrase included in the content item is assigned the objectionable status, abstaining from subsequently presenting the content item at the website;
   (7) when the at least one word or phrase included in the content item matches the at least one word or phrase in the second filter list, assigning a suspect status to the at least one word or phrase included in the content item and marking the content item for manual review by an administrative user; and
   (8) otherwise, assigning a non-objectionable status to the at least one word or phrase included in the content item; and
   at least temporarily, storing the content item, the at least one word or phrase included in the content item, and the assigned status in association with one another.

2. The computer-storage media of claim 1, wherein when it is determined that the at least one word or phrase included in the content item does not match the at least one word or phrase included in the first filter list or the second filter list, the method further comprises presenting the content item in association with the website.

3. The computer-storage media of claim 1, the method further comprising, based upon the manual review of the content item, receiving an indication from the administrative user regarding whether the at least one word or phrase included in the content item that is assigned the suspect status is subsequently assigned an objectionable status or a non-objectionable status.

4. The computer-storage media of claim 3, the method further comprising:
   when subsequently assigned an objectionable status, based upon the manual review, storing the at least one word or phrase in association with the assigned objectionable status, thereby updating the status of the at least one word or phrase as provided on the first filter list and the second filter list from a suspect status to an objectionable status; and
   when subsequently assigned an non-objectionable status, based upon the manual review, storing the at least one word or phrase in association with the assigned non-objectionable status, thereby removing the at least one word or phrase from the second filter list.

5. The computer-storage media of claim 1, wherein the categorization indicative of a particular level of abusiveness represents both a category and a level of abusiveness of the at least one word or phrase predetermined as having the objectionable status associated therewith, wherein the hate language categorization is associated with a higher level of abusiveness than the profanity categorization.

6. The computer-storage media of claim 5, wherein when it is determined that a plurality of words or phrases included in the content item matches one of the plurality of words or phrases included in the first filter list or the second filter list, the method further comprises consistently assigning the content item as a whole the status of the matching word or phrase of the plurality of words or phrases included in the content item having a highest level of abusiveness associated therewith.

7. The computer-storage media of claim 1, further comprising, providing an escalation path to second tier of support upon determining that the at least one word or phrase included in the content item that is assigned the suspect status cannot be initially assigned to an objectionable or a non-objectionable status with a high degree of confidence.

8. The computer-storage media of claim 5, the method further comprising, upon updating the status of the at least one word or phrase as provided on the first filter list and the second filter list, automatically initiating a re-scrubbing of the at least one word or phrase included in the content item upon meeting a predetermined criterion.

9. The computer-storage media of claim 1, the method further comprising:
assigning an order for comparison of filter lists within the first filter list and the second filter list, wherein the filter lists comprise a global filter list and a website-specific filter list; and
utilizing the filter lists for comparison according to the order, wherein the order indicates that when the global filter list is accessed, the global filter list is utilized for comparison before utilizing the website-specific filter list for comparison,
wherein discrepancies between comparisons to the filter lists are decided in favor of the website-specific filter list,
wherein the global filter list includes a list of words and phrases that are applicable to content items to be presented on any website that may be accessed by the user, and
wherein the website-specific filter list includes a list of words and phrases consistent with a website's published guidelines that are applicable to content items to be presented in association with the website.

10. The computer-storage media of claim 5, wherein automatically updating the second filter list by removing the at least one word or phrase comprises automatically initiating a rescrub of the content items with the updated second filter list.

11. A method for reviewing content items created by users for presentation in association with a website, wherein a computing device is employed to execute the method, the method comprising:
receiving a request from a user at the website for review of a user-created content item submitted for subsequent presentation at the website;
presenting, in association with the website, a user interface (UI) configured to receive information input by the user regarding the content item;
receiving an indication that the user has completed input of the information at the UI rendered by the computing device;
storing the content item in association with the information input by the user such that the content item is accessible for performing an automatic review process; and
upon receiving the indication, automatically initiating the automatic review process by comparing at least one word or phrase included in the content item with a first filter list and a second filter list, wherein the first filter list includes at least one word or phrase predetermined as having an objectionable status associated therewith and the second filter list includes at least one word or phrase predetermined as having a suspect status associated therewith, and wherein comparing comprises:
(a) accessing the first filter list and utilizing an exact matching technique to determine whether the at least one word or phrase included in the content item matches the at least one word or phrase in the first filter list having the objectionable status associated therewith, wherein the objectionable status refers to words or phrases having a categorization indicative of a particular level of abusiveness comprising at least one of spam, garbage, personal information, profanity, or hate language;
(b) accessing a second filter list and utilizing a pattern matching technique to determine whether the at least one word or phrase included in the content item matches the at least one word or phrase in the second filter list having the suspect status associated therewith, and wherein the suspect status refers to words or phrases that are less abusive than the words or the phrases determined to have the objectionable status;
(c) automatically determining whether the at least one word or phrase included in the content item matches the at least one word or phrase included in the first filter list or the second filter list;
(d) when the at least one word or phrase included in the content item matches the at least one word or phrase in the first filter list having the objectionable status associated therewith, performing the following steps:
(i) assigning the objectionable status to the at least one word or phrase included in the content item;
(ii) assigning an appropriate categorization to the at least one word or phrase included in the content item; and
(iii) abstaining from subsequently presenting the content item at the web site;
(e) when the at least one word or phrase included in the content item matches the at least one word or phrase having the suspect status associated therewith, assigning the suspect status to the at least one word or phrase included in the content item and marking the content item for manual review by an administrative user; and
(f) otherwise, considering the at least one word or phrase included in the content item non-objectionable.

12. The method of claim 11, wherein the user-created content item is subsequently presented at the website upon receiving an indication that the content item and the information input by the user has been reviewed.

13. The method of claim 11, further comprising, when an indication is received that the at least one word or phrase previously determined to have a suspect status has been considered to be non-objectionable, presenting the user-created content item in association with the website.

14. The method of claim 11, further comprising, when an indication is received that the at least one word or phrase previously determined to have a suspect status has been assigned an objectionable status, refraining from presenting the user-created content item in association with the web site.

15. The method of claim 11, wherein presenting for manual review the user-created content item with the at least one word or phrase singled out from a remainder of content in the user-created content item comprises rendering a user interface (UI) that includes a presentable menu of options for changing the status of the at least one word or phrase, previously determined to have a suspect status, to an objectionable status or a non-objectionable status.

16. The method of claim 11, wherein, when the content items created by the users for presentation in association with the website have already been published thereon, the at least one word or phrase previously determined to have a suspect status is linked to a violation report submitted by a visitor to the website for review.

* * * * *